US008200168B2

(12) United States Patent
Rofougaran et al.

(10) Patent No.: US 8,200,168 B2

(45) **Date of Patent: *Jun. 12, 2012**

(54) PROGRAMMABLE ANTENNA ASSEMBLY AND APPLICATIONS THEREOF

(75) Inventors: Ahmadreza (Reza) Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/215,477

(22) Filed: Aug. 23, 2011

(65) Prior Publication Data

US 2011/0310939 A1 Dec. 22, 2011

Related U.S. Application Data

(63) Continuation of application No. 12/813,798, filed on Jun. 11, 2010, now Pat. No. 8,014,732, which is a continuation of application No. 11/799,683, filed on May 2, 2007, now Pat. No. 7,761,061.

(51) Int. Cl.
*H04B 1/46* (2006.01)

(52) U.S. Cl. ................ 455/80; 455/78; 455/79; 455/82; 455/83; 455/552.1; 455/553.1; 455/121; 455/123; 455/124; 455/125; 455/280; 455/281; 455/334; 343/820; 343/822; 343/850; 343/852; 343/860; 343/861

(58) Field of Classification Search ............. 455/78–83, 455/552.1, 553.1, 561, 562.1, 101, 121, 123–125, 455/193.1–193.3, 280–282, 334; 343/820–823, 343/850–853, 860–861; 375/219
See application file for complete search history.

(56) References Cited

U.S. PATENT DOCUMENTS

| | | | | |
|---|---|---|---|---|
| 5,564,086 | A * | 10/1996 | Cygan et al. | 455/126 |
| 5,778,308 | A * | 7/1998 | Sroka et al. | 455/115.1 |
| 6,845,126 | B2 * | 1/2005 | Dent et al. | 375/219 |
| 6,961,368 | B2 * | 11/2005 | Dent et al. | 375/219 |
| 7,454,227 | B2 * | 11/2008 | Kitaji | 455/522 |
| 7,663,555 | B2 * | 2/2010 | Caimi et al. | 343/702 |

* cited by examiner

*Primary Examiner* — Tuan A Tran

(74) *Attorney, Agent, or Firm* — Garlick & Markison; Bruce E. Garlick

(57) ABSTRACT

A programmable antenna assembly includes a configurable antenna structure, a configurable antenna interface, and a control module. The configurable antenna structure includes a plurality of antenna elements that, in response to an antenna configuration signal, are configured elements into at least one antenna. The configurable antenna interface module is coupled to the at least one antenna and, based on an antenna interface control signal, provides at least one of an impedance matching circuit and a bandpass filter. The control module is coupled to generate the antenna configuration signal and the antenna interface control signal in accordance with a first frequency band and a second frequency band such that the at least one antenna facilitates at least one of transmitting and receiving a first RF signal within the first frequency band and facilitates at least one of transmitting and receiving a second RF signal within the second frequency band.

20 Claims, 11 Drawing Sheets

PROGRAMMABLE ANTENNA ASSEMBLY AND APPLICATIONS THEREOF

CROSS REFERENCE TO RELATED PATENTS

The present U.S. Utility patent application is a continuation of U.S. Utility patent application Ser. No. 12/813,798, filed Jun. 11, 2010, to be issued as U.S. Pat. No. 8,014,732 on Sep. 6, 2011, which is a continuation of U.S. Utility patent application, application Ser. No. 11/799,683, filed May 2, 2007, now issued as U.S. Pat. No. 7,761,061, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to antennas.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Since the wireless part of a wireless communication begins and ends with the antenna, a properly designed antenna structure is an important component of wireless communication devices. As is known, the antenna structure is designed to have a desired impedance (e.g., 50 Ohms) at an operating frequency, a desired bandwidth centered at the desired operating frequency, and a desired length (e.g., ¼ wavelength of the operating frequency for a monopole antenna). As is further known, the antenna structure may include a single monopole or dipole antenna, a diversity antenna structure, the same polarization, different polarization, and/or any number of other electro-magnetic properties.

One popular antenna structure for RF transceivers is a three-dimensional in-air helix antenna, which resembles an expanded spring. The in-air helix antenna provides a magnetic omni-directional mono pole antenna, but occupies a significant amount of space and its three dimensional aspects cannot be implemented on a planer substrate, such as a printed circuit board (PCB).

For PCB implemented antennas, the antenna has a meandering pattern on one surface of the PCB. Such an antenna consumes a relatively large area of the PCB. For example, a ¼ wavelength antenna at 900 MHz has a total length of approximately 8 centimeters (i.e., 0.25*32 cm, which is the approximate wavelength of a 900 MHz signal). As another example, a ¼ wavelength antenna at 2400 MHz has a total length of approximately 3 cm (i.e., 0.25*12.5 cm, which is the approximate wavelength of a 2400 MH signal). Even with a tight meandering pattern, a single 900 MHz antenna consumes approximately 4 $cm^2$.

If the RF transceiver is a multiple band transceiver (e.g., 900 MHz and 2400 MHz), then two antennas are needed, which consumes even more PCB space. With a never-ending push for smaller form factors with increased performance (e.g., multiple frequency band operation), current antenna structures are not practical for many newer wireless communication applications.

Therefore, a need exists for a multiple frequency band antenna structure without at least some of the above mentioned limitations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
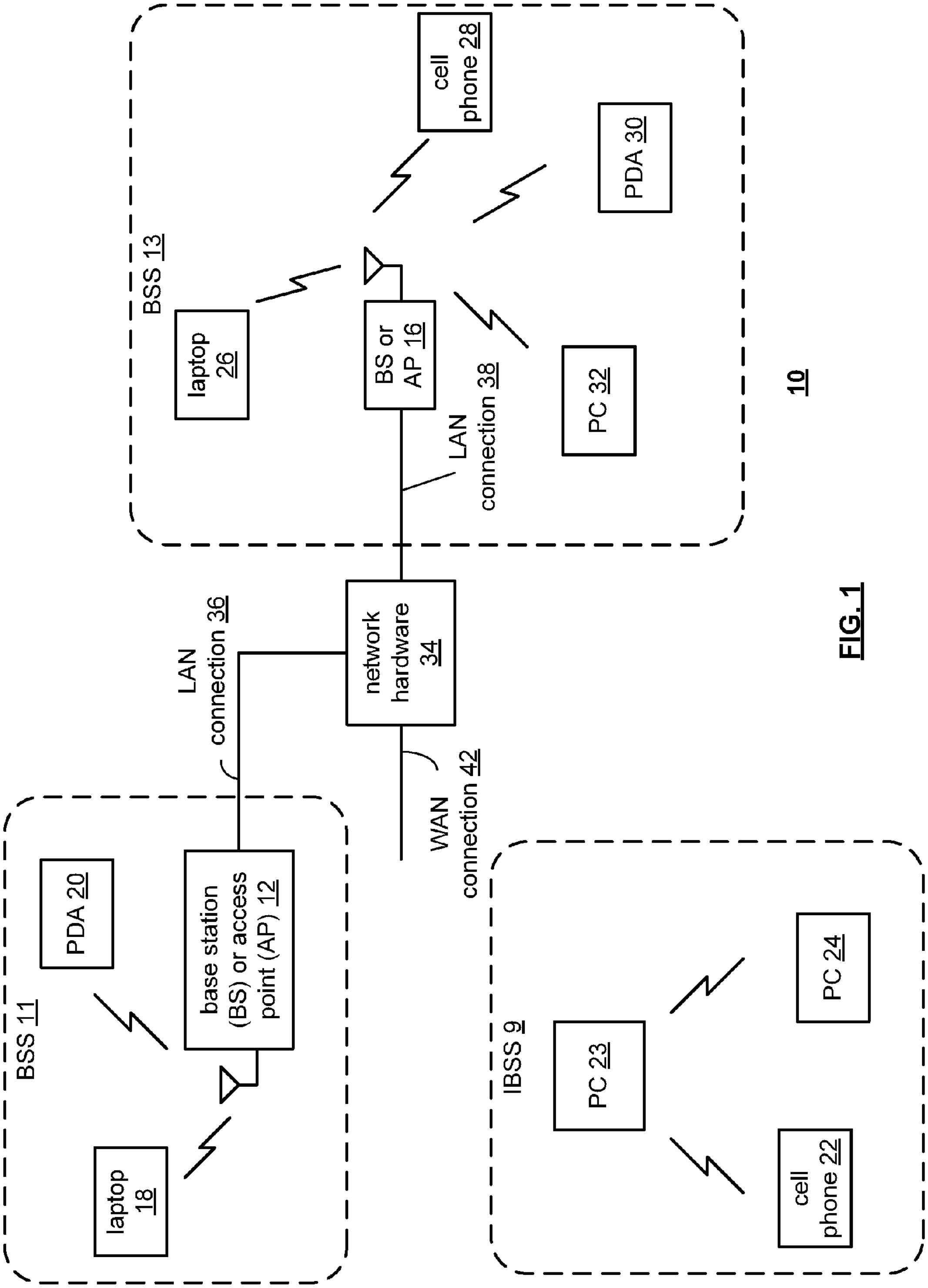
FIG. 1 is a schematic block diagram of an embodiment of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera, provides a wide area network connection 42 for the communication system 10. Further note that the wireless communication devices 18-32 may be laptop host computers 18 and 26, personal digital assistant hosts 20 and 30, personal computer hosts 24 and 32, and/or cellular telephone hosts 22 and 28 that include a wireless RF transceiver.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, RFID, and/or any other type of radio frequency based network protocol). Regardless of the particular type of communication system, each wireless communication device includes a built-in RF transceiver and/or is coupled to an RF transceiver. Note that one or more of the wireless communication devices may include an RFID reader and/or an RFID tag.

Figure 2:
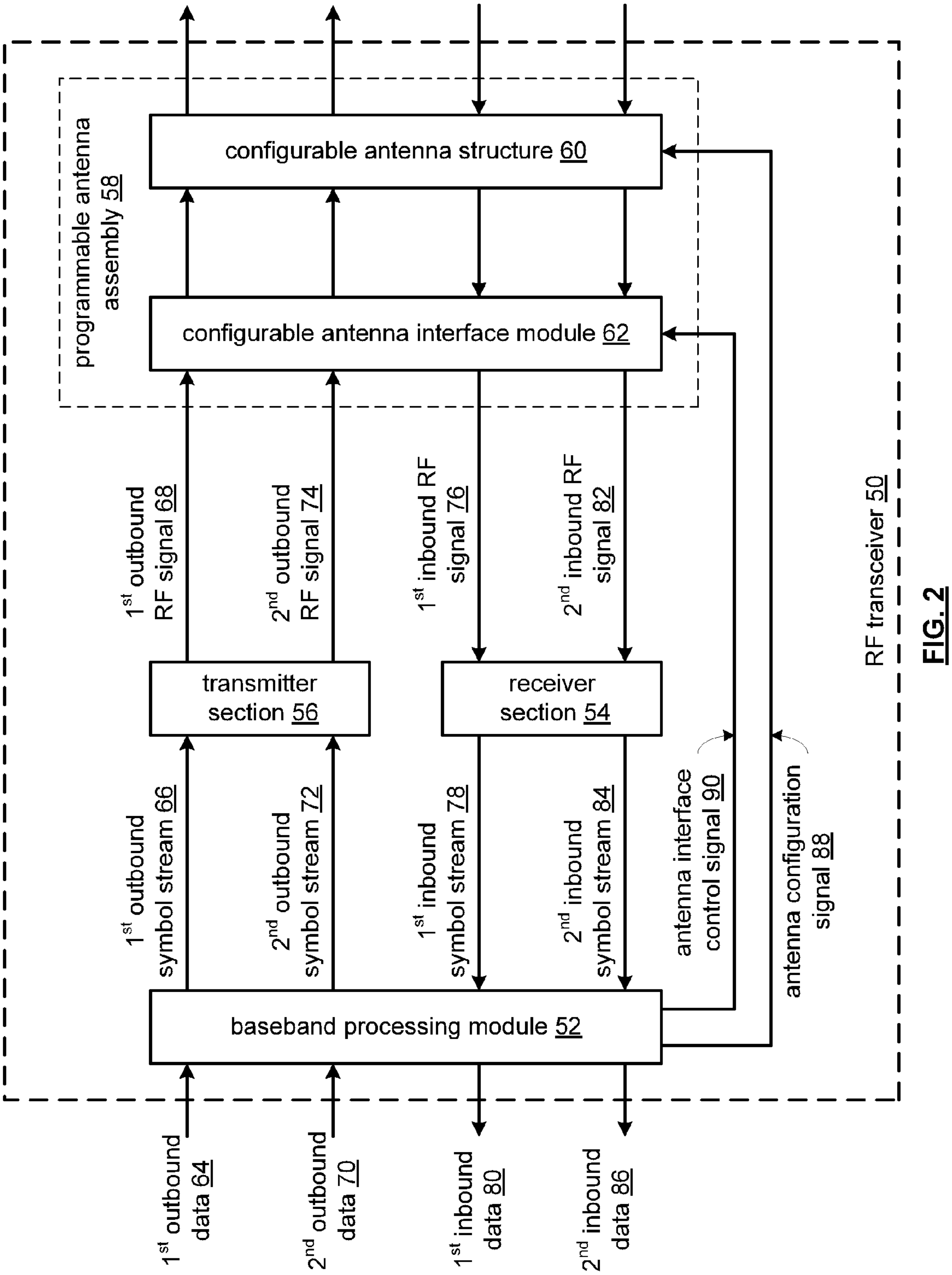
FIG. 2 is a schematic block diagram of an embodiment of an RF transceiver in accordance with the present invention.

FIG. 2 is a schematic block diagram of an embodiment of an RF transceiver 50 that includes a baseband processing module 52, a receiver section 54, a transmitter section 56, and a programmable antenna assembly 58. The programmable antenna assembly 58 includes a configurable antenna interface module 62 and a configurable antenna structure 60. The baseband processing module 52 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 2-13.

The baseband processing module 52 converts first outbound data 64, which may be voice, audio, text, video, images, graphics, etc., into a first outbound symbol stream 66 in accordance with a first wireless protocol. The baseband processing module 52 also converts second outbound data 70, which may be voice, audio, text, video, images, graphics, etc., into a second outbound symbol stream 72 in accordance with a second wireless protocol. The first and second wireless protocols may be one or more of RFID, IEEE 802.11, Bluetooth, AMPS, digital AMPS, GSM, CDMA, wide bandwidth CDMA (WCMDA), LMDS, MMDS, high-speed downlink packet access (HSDPA), high-speed uplink packet access (HSUPA), Enhanced Data rates for GSM Evolution (EDGE), General Packet Radio Service (GPRS), and/or variations thereof. For example, the first wireless protocol may GSM at 900 MHz and the second wireless protocol may be GSM at 1800 or 1900 MHz. As another example, the first wireless protocol may be EDGE or GPRS at 900 MHz and the second wireless protocol may be WCDMA at 1900 and 2100 MHz.

In an embodiment, the baseband processing module 52 performs one or more of scrambling, encoding, puncturing, interleaving, mapping, frequency to time conversion, and digital to analog conversion to convert the outbound data 64 and/or 70 into the outbound symbol stream 66 and/or 72. The mapping may include one or more of amplitude shift keying (ASK), phase shift keying (PSK), quadrature (PSK), 8-PSK, $2^N$ quadrature amplitude module (QAM), frequency shift keying (FSK), minimum shift keying (MSK), Gaussian MSK, and/or any derivative or combination thereof.

The transmitter section 56 converts the first outbound symbol stream 66 into a first outbound RF signal 68 and converts the second outbound symbol stream 72 into the second outbound RF signal 74. In an embodiment, this may be done by mixing the first or second symbol stream 66 or 72 with a first or second local oscillation to produce an up-converted signal. One or more power amplifiers and/or power amplifier drivers amplifies the up-converted signal, which may be RF bandpass filtered to produce the first or second RF signal 68 or 74. In another embodiment, the transmitter section 56 includes first and second oscillators that produce first and second oscillations. The first outbound symbol provides phase information (e.g., +/− Δθ [phase shift] and/or θ(t) [phase modulation]) that adjusts the phase of the first oscillation to produce a first phase adjusted RF signal and the second outbound symbol provides phase information that adjusts the phase of the second oscillation to produce a second phase adjusted RF signal. In this embodiment, the first phase adjusted RF signal corresponds to the first outbound RF signal 68 and the second phase adjusted RF signal corresponds to the second outbound RF signal 74. In another embodiment, the first and second outbound symbol streams 66 and 72 each include amplitude information (e.g., A(t) [amplitude modulation]), which is used, respectively, to adjust the amplitude of the first and second phase adjusted RF signals to produce the first and second RF signals 68 and 74.

In yet another embodiment, the transmitter section 56 includes first and second oscillators that produce first and second oscillations. The first outbound symbol provides frequency information (e.g., +/− Δf [frequency shift] and/or f(t) [frequency modulation]) that adjusts the frequency of the first oscillation to produce a first frequency adjusted RF signal and the second outbound symbol provides frequency information that adjusts the frequency of the second oscillation to produce a second frequency adjusted RF signal. In this embodiment, the first frequency adjusted RF signal corresponds to the first outbound RF signal 68 and the second frequency adjusted RF signal corresponds to the second outbound RF signal 74. In another embodiment, the first and second outbound symbol streams 66 and 72 each include amplitude information, which is used, respectively, to adjust the amplitude of the first and second frequency adjusted RF signals to produce the first and second RF signals 68 and 74.

In a further embodiment, the transmitter section 56 includes first and second oscillators that produce first and second oscillations. The first outbound symbol provides amplitude information (e.g., +/− ΔA [amplitude shift] and/or A(t) [amplitude modulation]) that adjusts the amplitude of the first oscillation to produce the first outbound RF signal 68 and the second outbound symbol provides amplitude information that adjusts the amplitude of the second oscillation to produce the second outbound RF signal 74.

The configurable antenna interface 62, which will be described in greater detail with reference to FIGS. 4-13, configures itself based on an antenna interface control signal 90 to provide an impedance matching circuit and/or a bandpass filter that couples the first and/or second outbound RF signals 68 74 to the configurable antenna structure 60. The configurable antenna structure 60, which will be described in greater detail with reference to FIGS. 4-13, configures itself based on an antenna configuration signal 88 to provide at least one antenna. The baseband processing module 52 generates the antenna configuration signal 88 and the antenna interface control signal 90 in accordance with the first and second wireless protocols. For example, the at least one antenna may be one antenna that is configured to transmit and/or receive the first outbound and/or inbound RF signal 68 or 76 and then be reconfigured to transmit and/or receive the second outbound and/or inbound RF signal 74 and/or 82. As another example, the at least one antenna may include two antennas, where the first antenna is configured to transmit and/or receive the first outbound and/or inbound RF signal 68 or 76 and the second antenna is configured to transmit and/or receive the second outbound and/or inbound RF signal 74 and/or 82. As a further example, the at least one antenna may include four antennas: one for transmitting the first outbound RF signal 68, a second for receiving the first inbound RF signal 76, a third for transmitting the second outbound RF signal 74, and a fourth for receiving the second inbound RF signal 82.

As a further example of the configuration of the programmable antenna structure 60, the at least one antenna may be one antenna array that is configured to transmit and/or receive the first outbound and/or inbound RF signal 68 or 76 in accordance with a RF transceiving convention (e.g., multiple input multiple output [MIMO], polarization, diversity, beamforming, half duplex RF communication, full duplex RF communication, and/or a combination thereof) and then be reconfigured to transmit and/or receive the second outbound and/or inbound RF signal 74 and/or 82 in accordance with a RF transceiving convention. As another example, the at least one antenna may include two antennas arrays, where the first antenna array is configured to transmit and/or receive the first outbound and/or inbound RF signal 68 or 76 in accordance with a RF transceiving convention and the second antenna array is configured to transmit and/or receive the second outbound and/or inbound RF signal 74 and/or 82 in accordance with a RF transceiving convention. As a further example, the at least one antenna may include four antenna arrays: one for transmitting the first outbound RF signal 68 in accordance with a RF transceiving convention, a second for receiving the first inbound RF signal 76 in accordance with a RF transceiving convention, a third for transmitting the second outbound RF signal 74 in accordance with a RF transceiving convention, and a fourth for receiving the second inbound RF signal 82 in accordance with a RF transceiving convention.

The programmable antenna assembly provides the first and second inbound RF signals 76 and 82 to the receiver section 54. The receiver section 54 converts the first inbound RF signal 76 into the first inbound symbol stream 78 and converts the second inbound RF signal 82 into the second inbound symbol stream 84. Note that the first inbound and outbound RF signals 68 and 76 have a carrier frequency within a first frequency band (e.g., 900 MHz) and the second inbound and outbound RF signals 74 and 82 have a carrier frequency within a second frequency band (e.g., 1800 MHz, 1900 MHz, 2100 MHz, 2.4 GHz, and/or 5 GHz). Further note that the carrier frequency, or frequencies, of the first inbound and outbound RF signals 68 and 76 and the carrier frequency, or frequencies, may be different carrier frequencies in the same frequency band, which includes 900 MHz frequency band, 1800 MHz frequency band, 1900 MHz frequency band, 2100 MHz frequency band, 2.4 GHz frequency band, 5 GHz frequency band, 60 GHz frequency band and/or any other frequency bands that are unlicensed or become unlicensed.

In an embodiment, the receiver section 54 may amplify the first and second inbound RF signals 76 and 82 to produce first and second amplified inbound RF signals. The receiver section 54 may then mix in-phase (I) and quadrature (Q) components of the first and second amplified inbound RF signal with in-phase and quadrature components of first and second local oscillations, respectively, to produce a first mixed I signal, a first mixed Q signal, a second mixed I signal, and a second mixed Q signal. The first mixed I and Q signals are combined to produce the first inbound symbol stream 78 and the second mixed I and Q signals are combined to produce the second inbound symbol stream 84. In this embodiment, the first and second inbound symbols 78 and 84 may each include phase information (e.g., +/− $\Delta\theta$ [phase shift] and/or $\theta(t)$ [phase modulation]) and/or frequency information (e.g., +/− $\Delta f$ [frequency shift] and/or $f(t)$ [frequency modulation]).

In another embodiment and/or in furtherance of the preceding embodiment, the first and/or second inbound RF signals 76 and 82 include amplitude information (e.g., +/− $\Delta A$ [amplitude shift] and/or $A(t)$ [amplitude modulation]). To recover the amplitude information, the receiver section 54 includes an amplitude detector such as an envelope detector, a low pass filter, etc.

The baseband processing module 52 converts the first inbound symbol stream 78 into first inbound data 80, which may be voice, audio, text, video, images, graphics, etc., in accordance with the first wireless protocol. The baseband processing module 52 also converts the second inbound symbol stream 84 into second inbound data 86, which may be voice, audio, text, video, images, graphics, etc., in accordance with the second wireless protocol.

Figure 3:
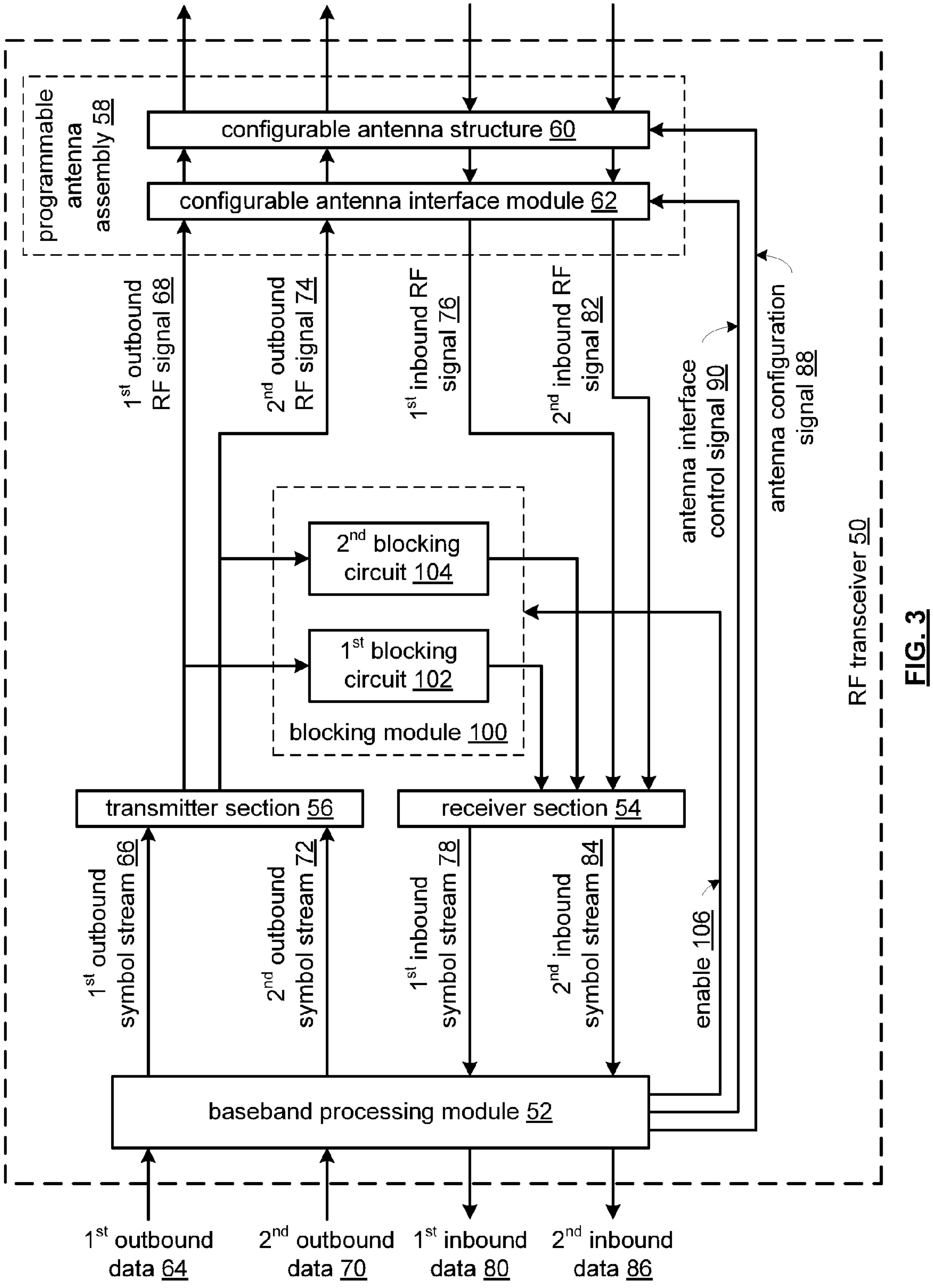
FIG. 3 is a schematic block diagram of another embodiment of an RF transceiver in accordance with the present invention.

FIG. 3 is a schematic block diagram of another embodiment of an RF transceiver 50 that includes the baseband processing module 50, the transmitter section 56, the receiver section 54, a blocking module 100, and the programmable antenna assembly 58. The blocking module 100 includes a first blocking circuit 102 and/or a second blocking circuit 104.

In this embodiment, when the first inbound and outbound RF signals 68 and 74 and/or the second inbound and outbound RF signals 76 and 82 are transmitted concurrently on different channels within their respective frequency bands, the baseband processing module 52 enables 106 the blocking module 100. For example, assume that the first inbound and outbound RF signals are generated in accordance with a 900 MHz GSM standard such that the up-link (e.g., transmit) frequency range is 880-915 MHz and the down-link (e.g., receive) frequency range is 925-960 MHz. In this example, the 1st blocking circuit 102 provides the 1st outbound RF signal 68 to the receiver section 54 such that the receiver section 54 alone or in combination with the first blocking circuit 102 substantially blocks (e.g., attenuates) the first outbound RF signal 68 from the first inbound RF signal 76.

Figure 4:
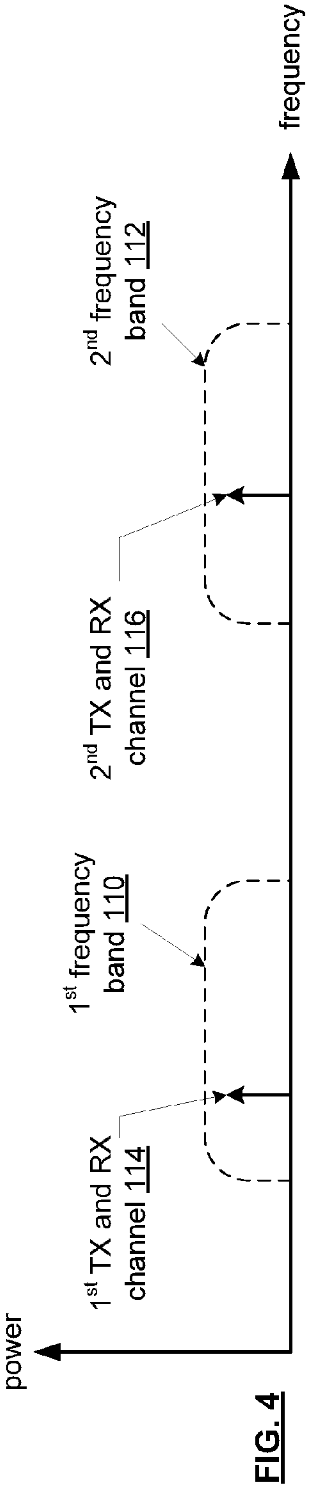
FIGS. 4-6 are diagrams of examples of frequency bands and antenna responses in accordance with the present invention.

FIG. 4 is a diagram of an example of first and second frequency bands 110 and 112. In this example, the first inbound and outbound RF signals 68 and 76 are transceived on the same channel or channels 114 within the first frequency band 110 and the second inbound and outbound RF signals 74 and 82 are transceived on the same channel or channels 116 within the second frequency band 112. For example, the first frequency band 110 may be a 900 MHz frequency band used to support RFID communications and the second frequency band may be 2.4 GHz to support Bluetooth and/or IEEE 802.11 wireless network communications. Note that the programmable antenna assembly 58 may be configured to provide a desired antenna response for the first transceiving channel or channels 114 and to provide a desired antenna response for the second transceiving channel or channels 116.

Figure 5:
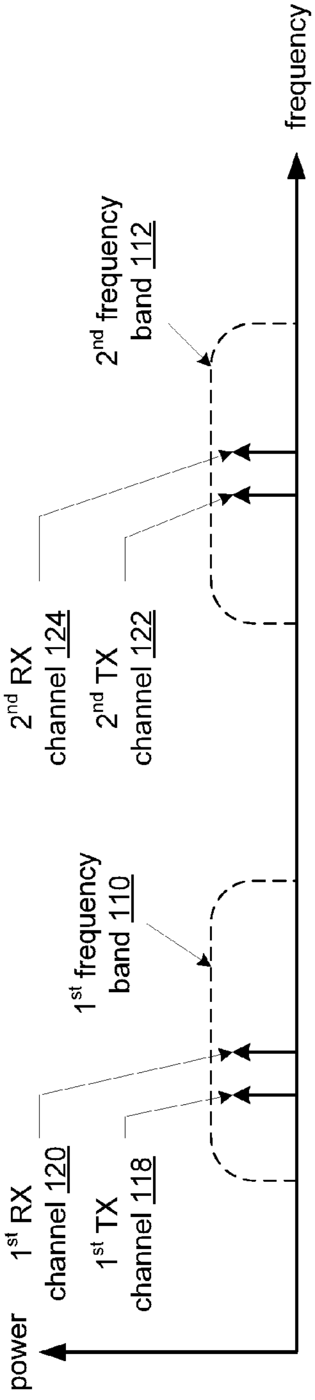

FIG. 5 is a diagram of another example of first and second frequency bands 110 and 112. In this example, the first outbound RF signal 68 is transmitted on a first transmit channel or channels 118 and the first inbound RF signal 76 is received on a first receive channel or channels 120 within the first frequency band 110. The second outbound RF signal 74 is transmitted on a second transmit channel or channels 122 and the second inbound RF signal 82 is received on a second receive channel or channels 124 within the second frequency band 112. For example, the first frequency band 110 may be a 900 MHz frequency band used to support GSM communications and the second frequency band may be 2.4 GHz to support Bluetooth and/or IEEE 802.11 wireless network communications.

Figure 6:
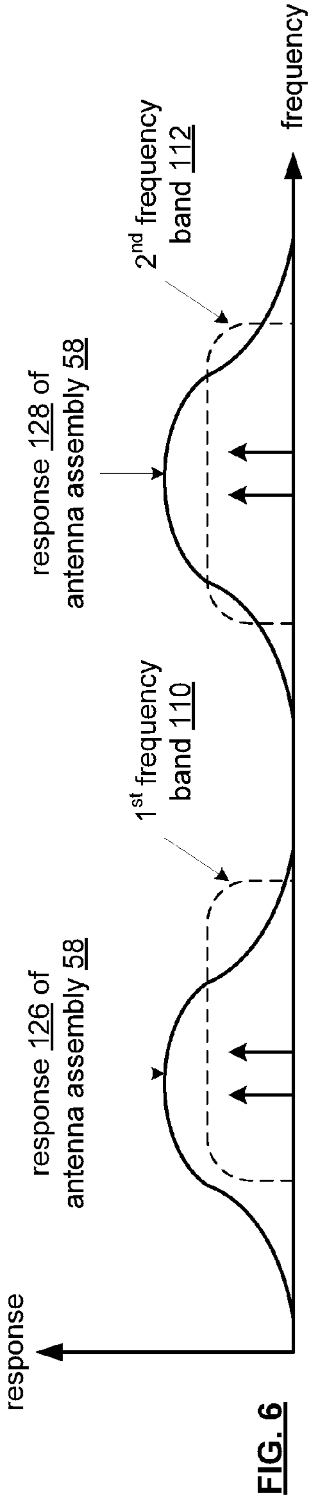

FIG. 6 is a diagram on an example of antenna responses for the RF signals of FIG. 5. In this example, the antenna response 126 of the programmable antenna assembly 58 may be adjusted such that the center frequency of the response corresponds to the transmit and/or receive channels 118 and/or 120. As is also shown, the antenna response 128 may be adjusted such that the center frequency corresponds to the center of the frequency band 112. In this example, the programmable antenna assembly 58 may provide four antennas or antenna arrays: one for the first transmit channel 118, a second for the first receive channel 120, a third for the second transmit channel 122, and a fourth for the second receive channel 124. Alternatively, the programmable antenna assembly 58 may provide two antennas that are configured in a first mode for the first transmit and receive channels 118 and 120 and, in a second mode, configured to support the second transmit and receive channels 122 and 124. Note that the antenna response of the programmable antenna assembly may be adjusted by adjusting an antenna's center frequency, an antenna's bandwidth, an antenna's quality factor, an antenna's inductance, an antenna's resistance, an antenna's effective wavelength, an antenna's frequency band, and/or an antenna's capacitance.

Figure 7:
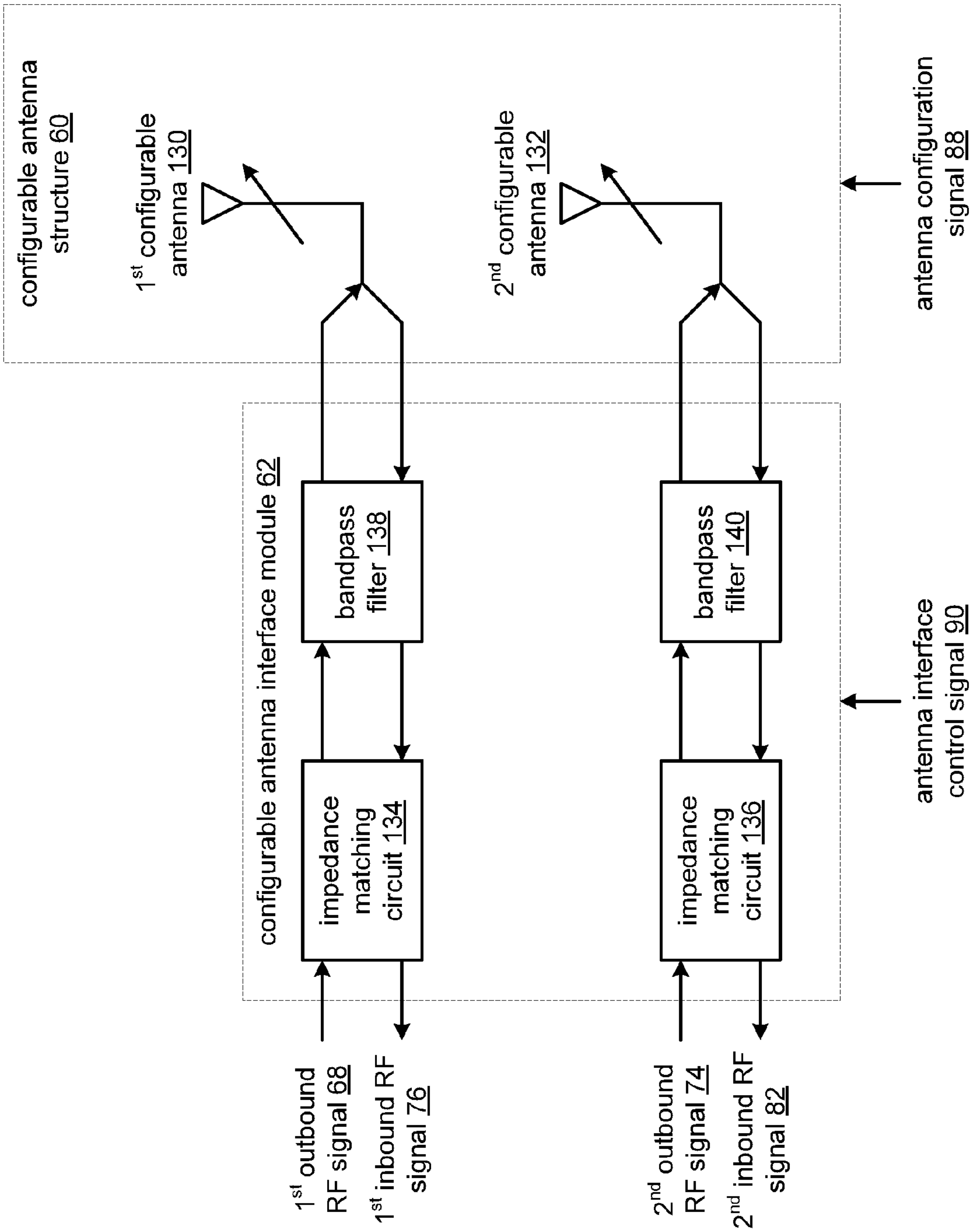
FIG. 7 is a schematic block diagram of an embodiment of a programmable antenna assembly in accordance with the present invention.

FIG. 7 is a schematic block diagram of an embodiment of a programmable antenna assembly 58 that includes the configurable antenna interface module 62 and the configurable antenna structure 60. The configurable antenna interface module 62 includes a first impedance matching circuit 134 and/or a first bandpass filter 138 and a second impedance matching circuit 136 and/or a second bandpass filter 140. The configurable antenna structure 60 includes a first configurable antenna 130 and a second configurable antenna 132.

In one embodiment, the baseband processing module 52 generates a first state of the antenna configuration signal 88 and a first state of the antenna interface control signal 90 in accordance with the first wireless protocol and generates a second state of the antenna configuration signal 88 and a second state of the antenna interface control signal 90 in accordance with the second wireless protocol. This may be done in a time division multiplexing (TDM) manner (e.g., the first state is active during one time slot and the second state is active during another time slot) or it may be done concurrently (e.g., the first and second states are concurrently active).

In the first state of the antenna configuration signal 88, the configurable antenna structure 60 configures itself into a first antenna, which may include one or more antennas. In this state, the first antenna transmits the first outbound RF signal 68 and receives the first inbound RF signal 76. Correspondingly, the configurable antenna interface 62 configures itself to provide the first impedance matching circuit 134 and/or the first bandpass filter 138 when the antenna interface control signal 90 is in the first state.

The configurable antenna structure 60 configures itself into a second antenna, which may include one or more antennas, when the antenna configuration signal 88 is in the second state. In this state, the second antenna transmits the second outbound RF signal 74 and receives the second inbound RF signal 82. Correspondingly, the configurable antenna interface 62 configures itself to provide the second impedance matching circuit 136 and/or the second bandpass filter 140 when the antenna interface control signal is in the second state.

As an example, when the first and second states of the antenna configuration signal 88 and the antenna interface control signal 90 are being generated in a TDM manner, the plurality of antenna elements of the configurable antenna structure 60 provide the first antenna for the first state and then are reconfigured to provide the second antenna for the second state. Similarly, the configurable antenna interface module 62 configures a plurality of adjustable inductors, capacitors, and/or resistors to provide the first impedance matching circuit 134 and/or the first bandpass filter 138 for the first state and then reconfigures the plurality of adjustable inductors, capacitors, and/or resistors to provide the second impedance matching circuit 136 and/or the second bandpass filter 140.

Figure 8:
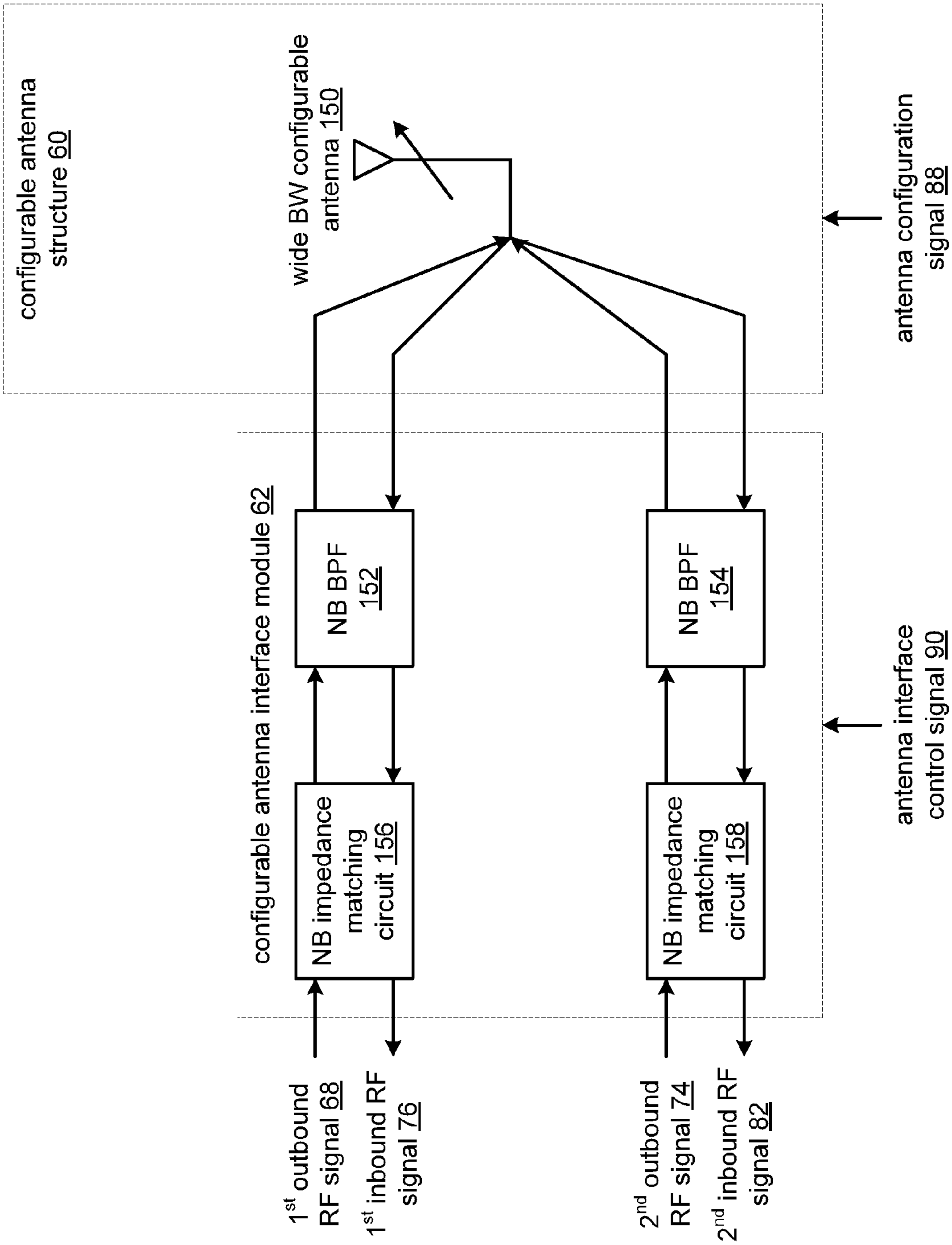
FIG. 8 is a schematic block diagram of another embodiment of a programmable antenna assembly in accordance with the present invention.

FIG. 8 is a schematic block diagram of another embodiment of a programmable antenna assembly 58 that includes the configurable antenna structure 60 and the configurable antenna interface module 62. The configurable antenna structure 60 provides a wide bandwidth (BW) configurable antenna 150 and the configurable antenna interface module 62 provides a first narrow bandwidth (NB) impedance matching circuit 156 and/or a narrow bandwidth bandpass filter (BPF) 152 and/or provides a second narrow bandwidth impedance matching circuit 158 and/or a second narrow bandwidth bandpass filter 154.

In an embodiment, the baseband processing module 52 generates a first state of the antenna interface control signal 90 in accordance with the first wireless protocol, generates a second state of the antenna interface control signal 90 in accordance with the second wireless protocol, and generates the antenna configuration signal 88 for both states. In response to the antenna configuration signal 88, the configuration antenna structure 60 configures itself into the wide bandwidth antenna 150 that concurrently transmits the first and/or second outbound RF signals 68 and 74 and/or concurrently receives the first and second inbound RF signals 76 and 82. For example, if the first wireless protocol corresponds to WCDMA, which operates in the 1900 and 2100 MHz frequency bands, and the second wireless protocol corresponds to Bluetooth, which operates in the 2.4 GHz frequency band, the wide bandwidth configurable antenna 150, which includes one or more antennas, has an antenna response to accommodate simultaneous transceiving of RF signals in the 1900 MHz, the 2100 MHz, and the 2.4 GHz frequency bands.

In the first state, the configurable antenna interface 62 provides the first narrow bandwidth impedance matching circuit 156 and/or the first narrow bandwidth bandpass filter 152 such that RF signals in the first frequency band are pass substantially unattenuated and RF signals in the second frequency band are substantially attenuated. In the second state, the configurable antenna interface 62 provides the second narrow bandwidth impedance matching circuit 158 and/or the second narrow bandwidth bandpass filter 154 such that RF signals in the second frequency band are pass substantially unattenuated and RF signals in the first frequency band are substantially attenuated. Note that the first and second states may be active separately in a TDM manner or concurrently.

In another embodiment, the baseband processing module 52 determines when the configurable antenna structure 60 can be configured into a wide bandwidth antenna to accommodate the first and second frequency bands. For example, if the first frequency band includes 1900 MHz and/or 2100 MHz (e.g., WCDMA, GSM, GPRS, EDGE, HSDPA, and/or HSUPA) and the second frequency band includes 2.4 GHz (e.g., Bluetooth, IEEE 802.11), then the baseband processing module 52 may determine that the configurable antenna structure 60 may be configured into a wide bandwidth antenna to accommodate both frequency bands. As another example, of the first frequency band includes 900 MHz (e.g., GSM, EDGE, GPRS, RFID) and the second frequency band includes 2.4 GHz (e.g., Bluetooth, IEEE 802.11), then the baseband processing module 52 may determine that the configurable antenna structure 60 may not be configured into a wide bandwidth antenna to accommodate both frequency bands.

When the configurable antenna structure 60 can be configured into the wide bandwidth antenna to accommodate the first and second frequency bands, the baseband module 52 generates a first state of the antenna interface control signal 90 in accordance with the first wireless protocol and generates a second state of the antenna interface control signal 90 in accordance with the second wireless protocol. The configurable antenna interface 62 provides the first narrow bandwidth impedance matching circuit 156 and/or the first narrow bandwidth bandpass filter 152 when the antenna interface control signal is in the first state and provides the second narrow bandwidth impedance matching circuit 158 and/or the second narrow bandwidth bandpass filter 154 when the antenna interface control signal is in the second state. The configuration antenna structure 60 configures itself into the wide bandwidth antenna 150.

When the configurable antenna structure 60 cannot be configured into the wide bandwidth antenna to accommodate the first and second frequency bands, the baseband processing module 52 generates a first state of the antenna configuration signal 88 and a third state of the antenna interface control signal 90 in accordance with the first wireless protocol and generates a second state of the antenna configuration signal 88 and a fourth state of the antenna interface control signal 90 in accordance with the second wireless protocol. The configuration antenna structure 60 configures itself into the first antenna 130 when the antenna configuration signal 88 is in the first state and configures itself into the second antenna 132 when the antenna configuration signal 88 is in the second state. The configurable antenna interface 60 provides the first impedance matching circuit 134 and/or the first bandpass filter 138 when the antenna interface control signal 90 is in the third state and provides the second impedance matching circuit 136 and/or the second bandpass filter 140 when the antenna interface control signal 90 is in the fourth state.

Figure 9:
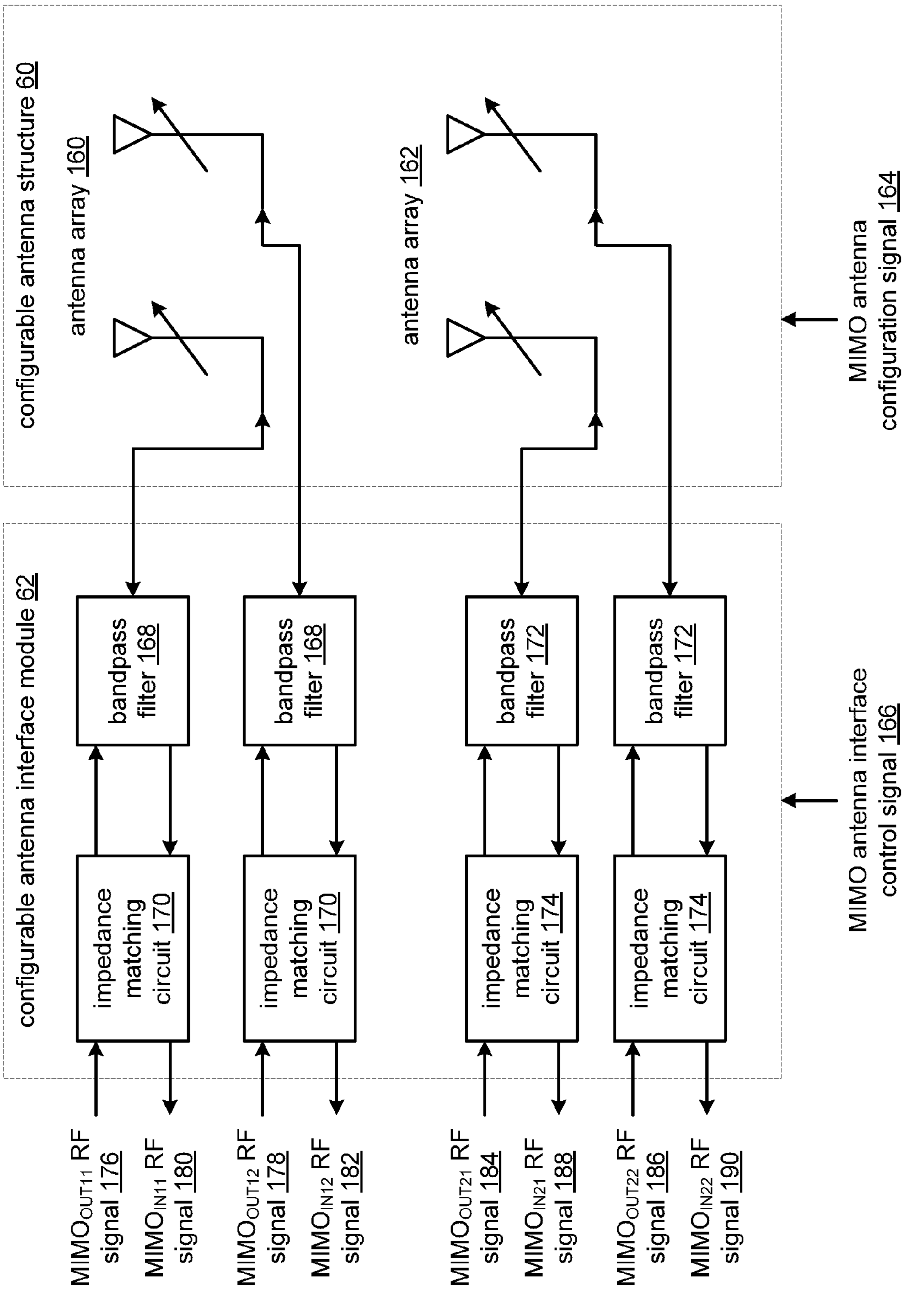
FIG. 9 is a schematic block diagram of another embodiment of a programmable antenna assembly in accordance with the present invention.

FIG. 9 is a schematic block diagram of another embodiment of a programmable antenna assembly 58 that includes the configurable antenna structure 60 and the configurable antenna interface module 62. In this embodiment, the baseband processing module 52 generates a MIMO antenna configuration signal 164 and the MIMO antenna interface control signal 166 in accordance with a MIMO communication for the first wireless protocol and/or for the second wireless protocol.

The configurable antenna structure 60 configures itself into a first antenna array 160 for the first inbound and outbound MIMO RF signals 176, 178, 180, and 182 and a second antenna array 162 for the second inbound and outbound MIMO RF signals 184, 188, 186, and 190 in response to MIMO antenna configuration signal 164. The configurable antenna interface module 62 provides a plurality of impedance matching circuits 170 and 174 and/or a plurality of bandpass filters 168 and 172 based on the MIMO antenna interface control signal 166. In this embodiment, the first and second wireless protocols support MIMO communications and that each of the antenna arrays 160 and 162 may include more than two antennas.

In an alternate embodiment, the first wireless protocol may support MIMO communications (e.g., IEEE 802.11n, which has a MIMO communication structure in the 2.4 GHz and/or the 5 GHz frequency bands) and the second wireless protocol is not a MIMO communication protocol (e.g., GSM, RFID, EDGE, GPRS operating in the 900 MHz frequency band). In this embodiment, the MIMO signals 164 and 166 would be generated for the first wireless protocol and the signals 88 and 90 would be generated for the second wireless protocol. Based on the signals 164 and 88, the configurable antenna structure 60 would configure itself into the antenna array 160 and the antenna 130.

Figure 10:
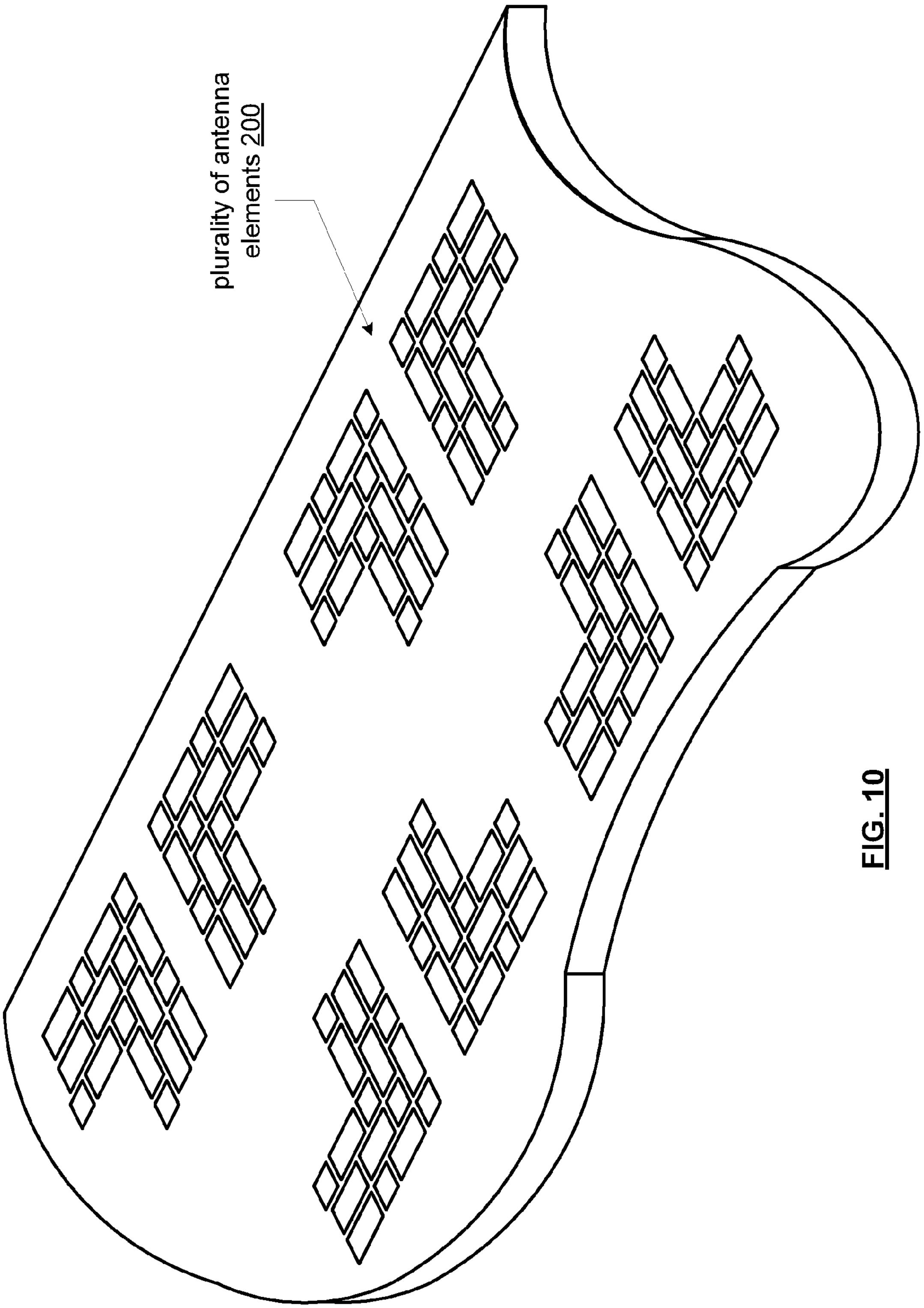
FIG. 10 is a schematic block diagram of another embodiment of a programmable antenna assembly in accordance with the present invention.

FIG. 10 is a schematic block diagram of another embodiment of a configurable antenna assembly 58 that includes a plurality of antenna elements 200. In this embodiment, the plurality of antenna elements 200 may be microstrips and/or metal traces on a printed circuit board (PCB) and/or on an integrated circuit. The plurality of antenna elements 200 may be configured into a two-dimensional mono pole antenna, a dipole antenna, a helix antenna, and/or a meandering antenna and/or may be configured into a three-dimensional helix antenna, a three-dimensional aperture antenna, a three-dimensional dipole antenna, and/or a three-dimensional reflector antenna.

For example, if the plurality of antenna elements 200 are configured into a two-dimensional dipole antenna, its desired length should be ½ the wavelength of the RF signals it transceives. The wavelength of a signal may be expressed as: $(\lambda)=c/f$, where c is the speed of light and f is frequency. For example, a ½ wavelength antenna at 900 MHz has a total length of approximately 16.5 centimeters (i.e., $0.50^*(3\times10^8$ m/s$)/(900\times10^6$ c/s$)=0.50^*33$ cm, where m/s is meters per second and c/s is cycles per second). As another example, a ½ wavelength antenna at 2400 MHz has a total length of approximately 6.25 cm (i.e., $0.50^*(3\times10^8$ m/s$)/(2.4\times10^9$ c/s$)=0.50^*12.5$ cm). Thus, by changing the length of the antenna by adding or deleting antenna elements 200 from an antenna (which may be done by transistors, inductive coupling, capacitive coupling, and/or switches), its length may be changed to accommodate different frequency bands.

In addition to changing the overall length of an antenna by adding or deleting antenna elements, the antenna's bandwidth, frequency response, quality factor, bandpass region, and/or impedance may be adjusted by changing the inductance, resistance, and/or capacitor of the configured antenna. For instance, each microstrip of the plurality of microstrips has an inductance and a resistance and is proximately located to one another. In one example, at least a first microstrip of the plurality of microstrips is substantially parallel to another one of the plurality of microstrips, at least a second microstrip of the plurality of microstrips is substantially perpendicular to a second another one of the plurality of microstrips, and/or a third microstrip of the plurality of microstrips is at an angle to a third another one of the plurality of microstrips.

Figure 11:
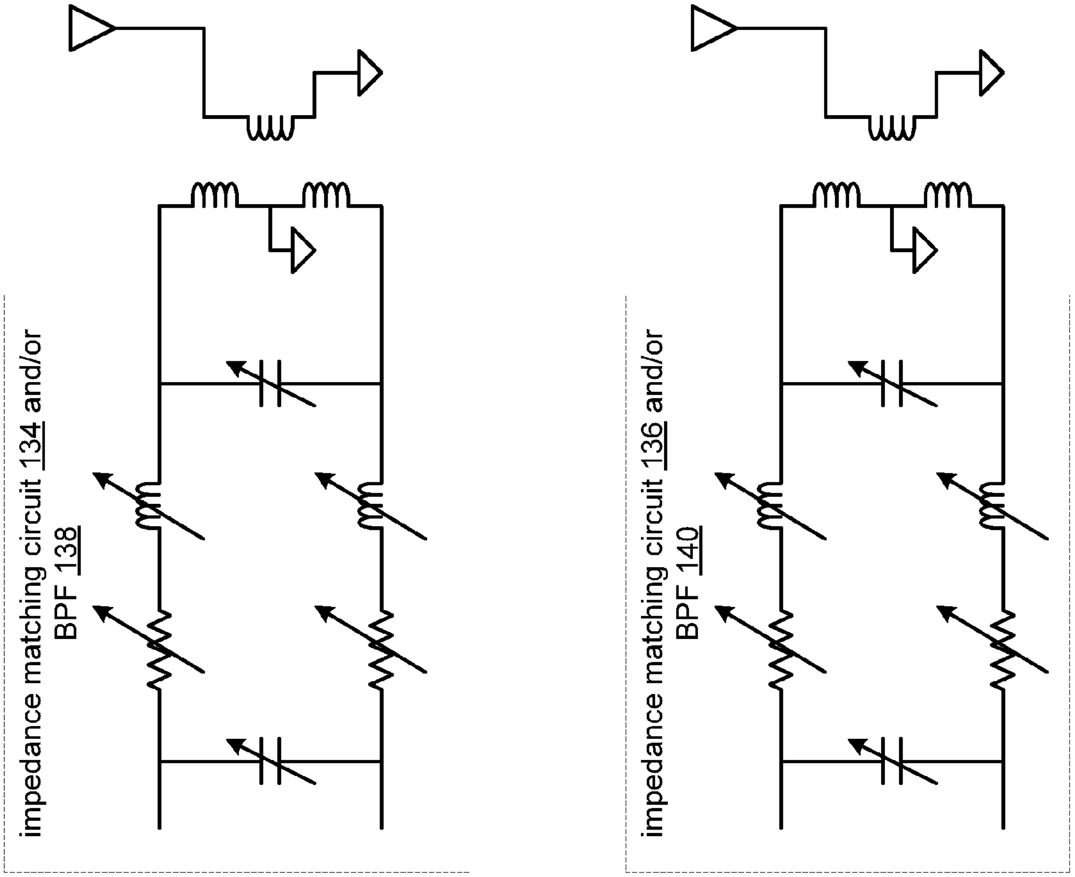
FIG. 11 is a schematic block diagram of another embodiment of a programmable antenna assembly in accordance with the present invention.

FIG. 11 is a schematic block diagram of another embodiment of a programmable antenna assembly 58 that includes the configurable antenna structure 60 and the configurable antenna interface module 62. In this embodiment, the configurable antenna structure is configured to provide a first antenna and a second antenna coupled via transformer baluns to the configurable antenna interface 62. The configurable antenna interface module 62 is configured to provide the first impedance matching circuit 134 and/or first bandpass filter 138 and the second impedance matching circuit 136 and/or the second bandpass filter 140.

In this embodiment, the first and second impedance matching circuits and/or bandpass filters 134, 136, 138, 140 includes a plurality of adjustable resistors, adjustable inductors, and/or adjustable capacitors. As such, the adjustable components may be adjusted to provide a desired impedance and/or a desired bandpass filter response (e.g., gain, bandpass region, frequency roll-off, etc.) for each of the antennas over a wide range of frequency bands.

Figure 12:
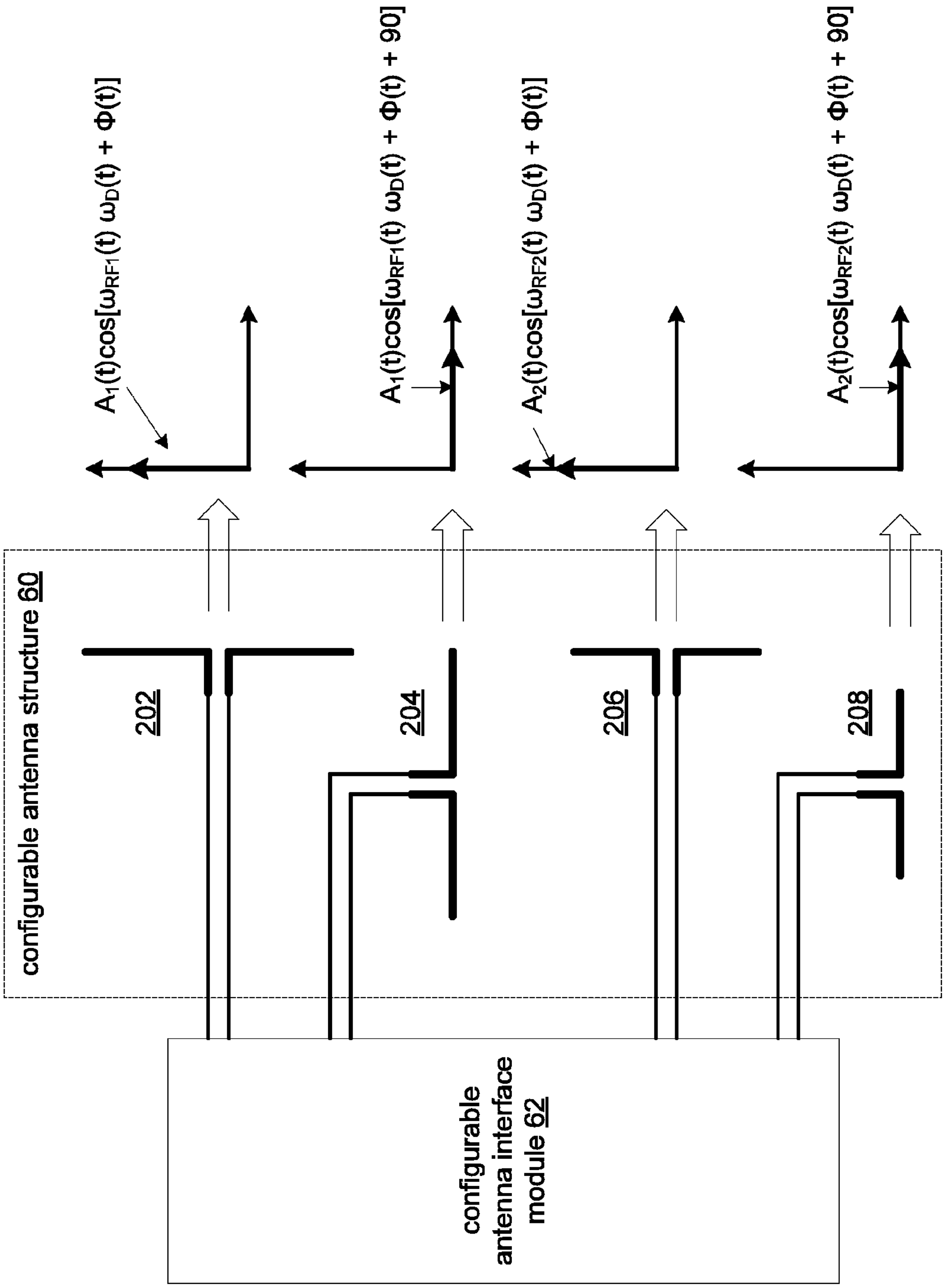
FIG. 12 is a schematic block diagram of another embodiment of a programmable antenna assembly in accordance with the present invention.

FIG. 12 is a schematic block diagram of another embodiment of a programmable antenna assembly 50 that includes the configurable antenna section 60 and the configurable antenna interface 62. The configurable antenna structure 60 is configured to provide first and second dipole antennas 202 and 204 for the first frequency band and third and fourth dipole antennas 206 and 208 for the second frequency band. In this example, the second frequency band is at a higher frequency than the first frequency band, as such, the length of the third and fourth antennas 206 and 204 is shorter than the length of the first and second antennas 202 and 204. In addition, the first antenna 202 is orthogonal with respect to the second antenna 204 and the third antenna 206 is orthogonal to the fourth antenna 208.

The orthogonal relationship between the antennas allows for in-air beamforming of the transmitted signals and for receiving of in-air beamformed signals. Alternatively, the orthogonal relationship allows for concurrent transceiving of signals within a frequency band wherein signals are transmitted on one of the orthogonal antennas and inbound signals are received on the other orthogonal antenna. As yet another alternative, a first RF outbound signal may be transmitted on a first one of the orthogonal antennas and a second RF outbound signal may be transmitted on a second one of the orthogonal antennas such that two communications can be simultaneously transmitted. In this example, the transmitting and receiving of two separate communications is done in a half duplex manner. For full duplex multiple communications, another pair of orthogonal antennas may be included.

As an example, antenna 202 may transmit and/or receive an RF signal that may be expressed as: $A1(t)\cos[\omega_{RF1}(t)+\omega_D(t)+\Phi(t)]$; and antenna 204 may transmit and/or receive an RF signal that may be expressed as: A1(t) cos [$\omega_{RF1}$(t)+$\omega_D$(t)+$\Phi$(t)+90°], where A1(t) is representative of amplitude information, $\omega_{RF1}$(t) is representative of the RF carrier frequency in the first frequency band, $\omega_D$(t) is representative a channel or subcarrier, and $\Phi$(t) is representative of phase information. Note that the RF signals may include only one of the amplitude information and the phase information or that that the RF signals may include frequency information instead of the phase information.

For in-air beamforming, the first and second antennas 202 and 204 are essentially transmitting the same signal with different phase offsets. In-air, the signals are summed together to produce a single RF signal having a phase offset based on the individual phase offsets of the two transmitted signals. For instance, with the orthogonal antennas having a 90° phase relationship, A1(t) cos [$\omega_{RF1}$(t)+$\omega_D$(t)+$\Phi$(t)]+A1(t) cos [$\omega_{RF1}$(t)+$\omega_D$(t)+$\Phi$(t)+90°]=2A1(t)*cos (45°)*cos [$\omega_{RF1}$(t)+$\omega_D$(t)+$\Phi$(t)+45°].

Antennas 206 and 208 may be used in a similar manner as antennas 202 and 204, but in the second frequency band. As such, antenna 206 may transmit and/or receive an RF signal that may be expressed as: A2(t) cos [$\omega_{RF2}$(t)+$\omega_D$(t)+$\Phi$(t)]; and antenna 208 may transmit and/or receive an RF signal that may be expressed as: A2(t) cos [$\omega_{RF2}$(t)+$\omega_D$(t)+$\Phi$(t)+90°], where A2(t) is representative of amplitude information, $\omega_{RF2}$(t) is representative of the RF carrier frequency in the second frequency band, $\omega_D$(t) is representative a channel or subcarrier, and $\Phi$(t) is representative of phase information.

For concurrent polarized transmissions (e.g., transmitting on antenna 202 and receiving on antenna 204 and/or transmitting on antenna 206 and receiving on antenna 208), the configurable antenna structure 60 configures itself to provide the antennas 202, 204, 206, and 208, which have an orthogonal relationship as discussed. The configurable antenna interface module 60 is configured to provide a first impedance matching circuit and/or a first bandpass filter and a second impedance matching circuit and/or a second bandpass filter based on the antenna interface control signal. The baseband processing module 52 generates the antenna configuration signal 88 and the antenna interface control signal 90 in accordance with the first frequency band, the second frequency band, and a polarization setting.

Figure 13:
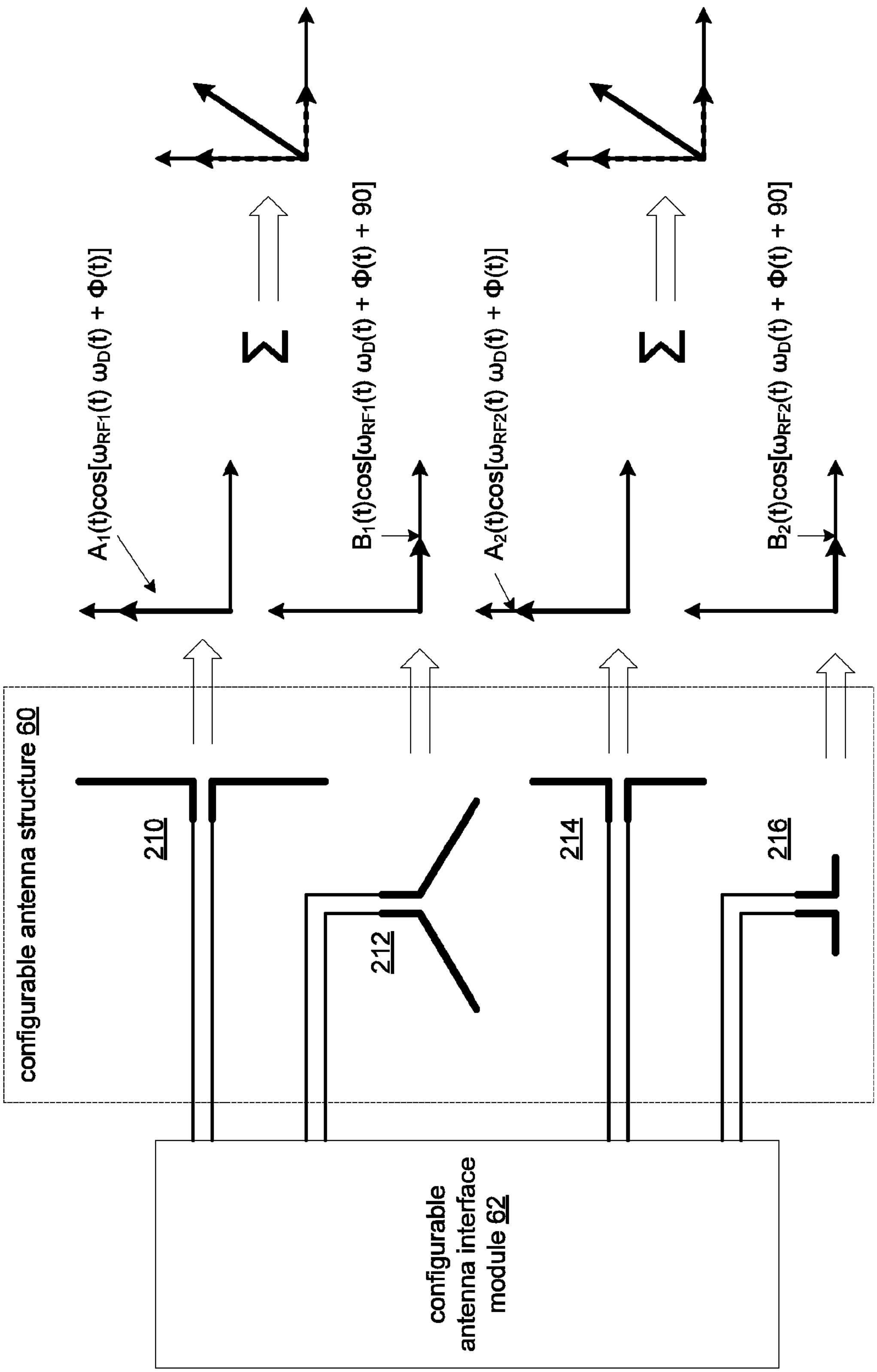
FIG. 13 is a schematic block diagram of another embodiment of a programmable antenna assembly in accordance with the present invention.

FIG. 13 is a schematic block diagram of another embodiment of a programmable antenna assembly 50 that includes the configurable antenna section 60 and the configurable antenna interface 62. The configurable antenna structure 60 is configured to provide first and second dipole antennas 210 and 212 for the first frequency band and third and fourth dipole antennas 214 and 216 for the second frequency band. In this example, the second frequency band is at a higher frequency than the first frequency band, as such, the length of the third and fourth antennas 214 and 216 is shorter than the length of the first and second antennas 210 and 212. In addition, the first antenna 210 is orthogonal with respect to the second antenna 212 and the third antenna 214 is orthogonal to the fourth antenna 216.

In this embodiment, the first and second antennas 210 and 212 are dipole antennas. The first antenna 210 has a radiation portion based on an angle of approximately 180 degrees between the dipole sections and the second antenna 212 has a radiation portion based on an angle of less than 180 degrees between the dipole sections. In this instance, the radiation strength of the first antenna 210 is greater than radiation strength of the second antenna 212.

As an example, antenna 210 may transmit and/or receive an RF signal that may be expressed as: A1(t) cos [$\omega_{RF1}$(t)+$\omega_D$(t)+$\Phi$(t)]; and antenna 212 may transmit and/or receive an RF signal that may be expressed as: B1(t) cos [$\omega_{RF1}$(t)+$\omega_D$(t)+$\Phi$(t)+90°], where A1(t) is representative of amplitude information, B1(t) is a scaled representation of A1(t), $\omega_{RF1}$(t) is representative of the RF carrier frequency in the first frequency band, $\omega_D$(t) is representative a channel or subcarrier, and $\Phi$(t) is representative of phase information. When these RF signals are summed in-air, the resulting phase offset is based on the angle established by A1(t) and B1(t).

As is further shown, the configurable antenna structure 60 may configure itself to provide the third and fourth antennas 214 and 216. The third antenna 214 is substantially orthogonal to the fourth antenna 216 and is a one-half wavelength dipole antenna. The fourth antenna 216 is a less than one-half wavelength dipole antennas. As such, the amplitude of the signal transmitted by the fourth antenna 216 will be less than the amplitude of the signal transmitted by the third antenna 214 assuming equal transmit power. For example, antenna 214 may transmit and/or receive an RF signal that may be expressed as: A2(t) cos [$\omega_{RF2}$(t)+$\omega_D$(t)+$\Phi$(t)]; and antenna 216 may transmit and/or receive an RF signal that may be expressed as: B2(t) cos [$\omega_{RF2}$(t)+$\omega_D$(t)+$\Phi$(t)+90°], where A2(t) is representative of amplitude information, B2(t) is a scaled representation of A2(t), $\omega_{RF2}$(t) is representative of the RF carrier frequency in the second frequency band, $\omega_D$(t) is representative a channel or subcarrier, and $\Phi$(t) is representative of phase information.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A wireless device comprising:

a housing; and a Radio Frequency (RF) transceiver contained at least partially in the housing and comprising:

a baseband processing module;

transceiver circuitry coupled to the baseband processing module;

a configurable antenna structure that includes a plurality of antenna elements, wherein, in response to an antenna configuration signal, the configurable antenna structure is operable to configure at least some of the plurality of antenna elements into at least one antenna; and a configurable antenna interface module coupled to the configurable antenna structure and to the transceiver circuitry, wherein, based on an antenna interface control signal, the configurable antenna interface is operable to configure into at least one of an impedance matching circuit and a bandpass filter.

2. The wireless device of claim 1, wherein the baseband processing module is operable to produce the antenna configuration signal and the antenna interface control signal.

3. The wireless device of claim 1, wherein in response to a respective antenna configuration signal, the configurable antenna structure is operable to form first and second Multiple Input Multiple Output (MIMO) antennas from the plurality of configurable antenna elements.

4. The wireless device of claim 1, wherein in response to a respective antenna interface control signal the configurable antenna interface module is operable to form:

a first impedance matching circuit and first bandpass filter for the first MIMO antenna; and a second impedance matching circuit and a second bandpass filter for the second MIMO antenna.

5. The wireless device of claim 1, wherein in response to a respective antenna configuration signal, the configurable antenna structure is operable to form both a first antenna and a second antenna.

6. The wireless device of claim 5, wherein:

the first antenna is operable to service Wireless Local Area Network (WLAN) RF signals; and the second antenna is operable to service cellular communication RF signals.

7. The wireless device of claim 5, wherein:

the first antenna is substantially orthogonal to the second antenna; and the first and second antennas are dipole antennas.

8. The wireless device of claim 7, wherein:

the antenna elements of the plurality of antenna elements that constitute a radiation portion of the second antenna are at an angle of approximately 180 degrees; and the antenna elements of the plurality of antenna elements that constitute a radiation portion of the first antenna are at an angle of less than 180 degrees such that radiation strength of the first antenna is less than radiation strength of the second antenna.

9. The wireless device of claim 5, wherein:

the first antenna is substantially orthogonal to the second antenna;

the first antenna is a one-half wavelength dipole antenna; and the second antenna is a less than one-half wavelength dipole antenna.

10. The wireless device of claim 1, wherein the configurable antenna structure is formed at least partially in a Printed Circuit Board (PCB).

11. The wireless device of claim 1, wherein the configurable antenna structure comprises a plurality of microstrips, wherein:

each microstrip of the plurality of microstrips has an inductance and a resistance;

the plurality of microstrips are proximately located to one another;

at least a first microstrip of the plurality of microstrips is substantially parallel to another one of the plurality of microstrips; and at least a second microstrip of the plurality of microstrips is substantially perpendicular to a second another one of the plurality of microstrips.

12. The wireless device of claim 1, wherein the plurality of antenna elements are configurable into at least two of:

a two-dimensional mono pole antenna;

a dipole antenna;

a helix antenna;

a meandering antenna;

a three-dimensional helix antenna;

a three-dimensional aperture antenna;

a three-dimensional dipole antenna; and a three-dimensional reflector antenna.

13. The wireless device of claim 1, wherein the configurable antenna structure comprises a plurality of microstrips, each microstrip of the plurality of microstrips has an inductance and a resistance, wherein the plurality of microstrips are proximately located to one another.

14. The wireless device of claim 13, wherein the plurality of microstrips comprises:

a first microstrip that is substantially parallel to first another one of the plurality of microstrips; and a second microstrip that is substantially perpendicular to a second another one of the plurality of microstrips.

15. The wireless device of claim 14, wherein the plurality of microstrips comprises a third microstrip that is at an angle respective to a third another one of the plurality of microstrips.

16. The wireless device of claim 1, wherein the configurable antenna interface module comprises at least two of:

a first impedance matching circuit;

a first bandpass filter;

a second impedance matching circuit; and a second bandpass filter.

17. The wireless device of claim 1, wherein the configurable antenna interface module comprises at least one of:

a plurality of adjustable inductors;

a plurality of adjustable capacitors; and a plurality of adjustable resistors.

18. A wireless device comprising:

a housing; and a Radio Frequency (RF) transceiver contained in the housing and comprising:

a baseband processing module;

transceiver circuitry coupled to the baseband processing module;

a configurable antenna structure that includes a plurality of antenna elements, wherein, in response to an antenna configuration signal, the configurable antenna structure is operable to configure the plurality of antenna elements into both a first antenna and a second antenna; and a configurable antenna interface module coupled to the configurable antenna structure and to the transceiver circuitry, wherein, based on an antenna interface control signal, the configurable antenna interface is operable to configure into first and second impedance matching circuits and first and second bandpass filters.

19. The wireless device of claim 18, wherein:

the first antenna is operable to service Wireless Local Area Network (WLAN) RF signals; and the second antenna is operable to service cellular communication RF signals.

20. The wireless device of claim 18, wherein:

the first antenna is a first Multiple Input Multiple Output (MIMO) antenna; and the second antenna is a second MIMO antenna.

* * * * *